(12) United States Patent
Bean

(10) Patent No.: US 6,628,331 B1
(45) Date of Patent: Sep. 30, 2003

(54) CYAN-MAGENTA-YELLOW-BLUE COLOR FILTER ARRAY

(75) Inventor: John Joseph Bean, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/215,687

(22) Filed: Dec. 18, 1998

(51) Int. Cl.[7] .................................................. H04N 3/14
(52) U.S. Cl. ........................ 348/273; 348/272; 348/279
(58) Field of Search ................................. 348/272, 273, 348/277, 279, 266, 268; 257/440; 358/482, 483; 250/208.1; H04N 9/07, 9/083

(56) References Cited

U.S. PATENT DOCUMENTS

| | | | | |
|---|---|---|---|---|
| 4,121,244 A | * | 10/1978 | Nakabe et al. | 348/276 |
| 4,245,241 A | * | 1/1981 | Sato et al. | 348/279 |
| 4,246,601 A | * | 1/1981 | Sato et al. | 348/277 |
| 4,513,312 A | * | 4/1985 | Takemura | 348/275 |
| 4,764,670 A | * | 8/1988 | Pace et al. | 250/226 |
| 4,885,634 A | * | 12/1989 | Yabe | 348/71 |
| 5,929,432 A | * | 7/1999 | Yamakawa | 250/208.1 |

* cited by examiner

*Primary Examiner*—Ngoc-Yen Vu
*Assistant Examiner*—Justin Misleh
(74) *Attorney, Agent, or Firm*—Seth Z. Kalson

(57) ABSTRACT

A color filter array for CMOS and CCD image sensor applications, the color filter array having a tiling pattern of cyan, magenta, yellow, and blue pass filters. An imaging device with this color filter array provides signals in a CMYB color space.

8 Claims, 4 Drawing Sheets

CYAN-MAGENTA-YELLOW-BLUE COLOR FILTER ARRAY

FIELD OF INVENTION

The present invention relates to imaging, and more particularly, to a color filter array.

BACKGROUND

A simplified cross sectional view of an imaging system is illustrated in FIG. 1. Optical system 102 focuses electromagnetic radiation onto a focal plane, which may be taken as Color Filter Array (CFA) 104 and pixel sensor array 106. The CFA is usually deposited over pixel sensor array 106 by photo-lithographic techniques well known to the semiconductor industry. Pixel sensor array 106 is an array of pixel sensors, where in general, a pixel sensor is any sensor which absorbs radiation and provides a signal indicative of the absorbed radiation. Pixel sensor array 106 may be, for example, an array of charge coupled devices (CCD), or an integrated array of CMOS (Complementary Metal Oxide Semiconductor) pixel circuits. A pixel circuit may comprise a photo diode, where photons absorbed by the photo diode generate electron-hole pairs, along with additional circuits to provide an electrical signal, either a voltage or current signal, indicative of the number of photons absorbed by the photo diode. Photons incident upon various pixel circuits are pictorially indicated by 108.

The spectral content of electromagnetic radiation focused onto a focal plane depends upon, among other things, the imaged subject, the illumination of the subject, the transmission characteristics of the propagation path between the imaged subject and optical system 102, the materials used in optical system 102, as well the geometric shape and size of optical system 102. For consumer imaging systems, the spectral range of interest is the visible region of the electromagnetic spectrum.

The CFA is an array of filters, usually contiguous and deposited over pixel sensor array 106 so that each pixel sensor is substantially sensitive to only the electromagnetic radiation passed by one filter. (A filter in the CFA may actually be a composite filter manufactured from two or more filters, so that the transfer function of the resulting filter is the product of the transfer functions of its constituent filters.) Each filter in the CFA passes electromagnetic radiation within some spectral range. For example, common color filter arrays include a RGB (Red-Green-Blue) CFA, composed of red, green, and blue filters only, a CMY (Cyan-Magenta-Yellow) CFA, composed of cyan, magenta, and yellow filters only, or a CMYG CFA (Cyan-Magenta-Yellow-Green), composed of cyan, magenta, yellow, and green filters only. The pattern of filters making up an CFA is often a tiling pattern, where the tiling pattern is a repetition of a simpler, smaller pattern of filters, which we term the unit cell array.

The color fidelity of color CMOS and CCD imaging sensors may be highly dependent upon the selection of CFA materials, as well as the CFA tiling pattern. The RGB CFA is often selected for its simplified signal processing requirements and good color fidelity. The CMY and CMYG color filter arrays are often selected for use in applications which require improved light sensitivity. However, the signal-to-noise ratio of imaging sensors with CMY or CMYG color filter arrays is often less than that of imaging sensors with a RGB CFA.

It is therefore desirable to provide a CFA for imaging sensors so that there is both good color fidelity and relatively high signal-to-noise ratio.

DETAILED DESCRIPTION OF EMBODIMENTS

Figure 1:
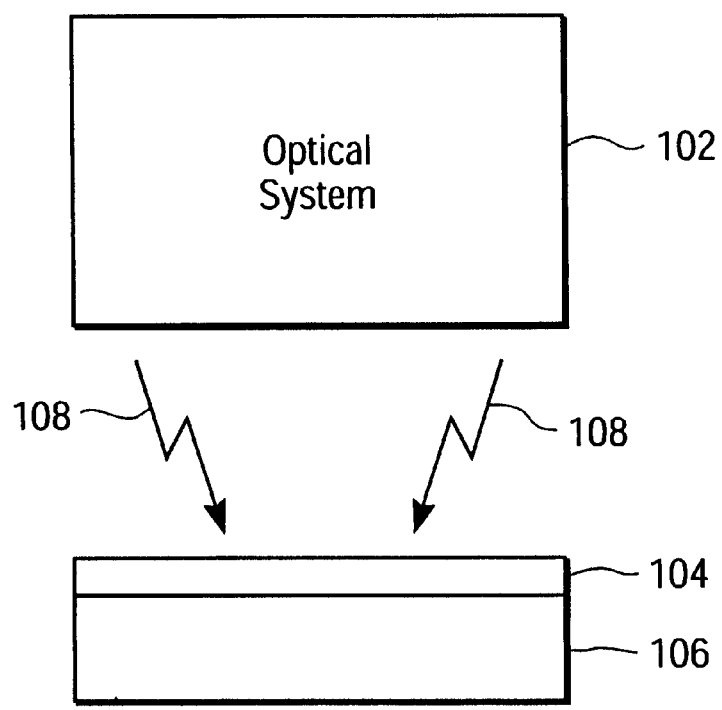
FIG. 1 illustrates a simplified cross sectional view of an imaging system.
Figure 2:
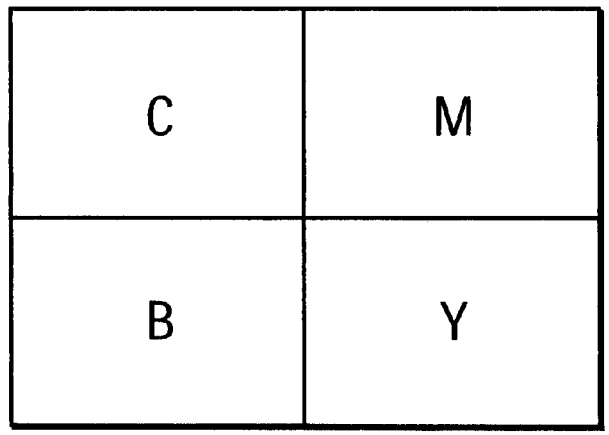
FIG. 2 is a unit array of a CFA according to an embodiment of the present invention.

FIG. 2 illustrates a unit cell array of a tiling pattern according to an embodiment of the present invention, where C, M, Y, and B denote cyan, magenta, yellow, and blue pass filters, respectively. The tiling pattern is provided by repeating the unit cell array of FIG. 2 in both orthogonal directions (i.e., the row and column directions). The number of repetitions may be non-integral.

There are another seven 2×2 unit cell arrays comprising C, M, Y, and B pass filters that provide equivalent tiling patterns to the pattern obtained from the unit cell array of FIG. 2. That is, the eight unit cell arrays $$\left\{ \begin{bmatrix} C & M \\ B & Y \end{bmatrix}, \begin{bmatrix} M & C \\ Y & B \end{bmatrix}, \begin{bmatrix} B & Y \\ C & M \end{bmatrix}, \begin{bmatrix} Y & B \\ M & C \end{bmatrix}, \right.$$
$$\left. \begin{bmatrix} M & Y \\ C & B \end{bmatrix}, \begin{bmatrix} Y & M \\ B & C \end{bmatrix}, \begin{bmatrix} C & B \\ M & Y \end{bmatrix}, \begin{bmatrix} B & C \\ Y & M \end{bmatrix} \right\}$$

when repeated indefinitely in the two orthogonal directions provide equivalent tiling patterns. (Note that two tiling patterns are equivalent if they are related to each other by a rotation.) There will be "edge" effects when repeating a unit cell array a finite number of times, so that in practice not all of the resulting patterns from the above unit cell arrays are exactly identical. However, for a large number of repetitions, these edge effects may be ignored, in which case the above unit cell arrays are equivalent to each other in the sense that they provide equivalent tiling patterns. Another way of stating this is that the above unit cell arrays belong to the same equivalence class.

Any unit cell array can be concatenated with itself to form a larger unit cell array that provides the same tiling pattern. Consequently, the above equivalence class would be larger if larger sized unit cell arrays were considered.

It is to be understood when interpreting the claims concluding this specification that a color filter array comprising a given unit cell array is any pattern of filters having a unit cell array belonging to the same equivalence class as the given unit cell array.

In addition to the above equivalence class of 2×2 unit cell arrays, there are two other equivalence classes of 2×2 unit cell arrays having C, M, Y, and B pass filters. They are the equivalence class having as a member the unit cell array $$\begin{bmatrix} C & M \\ Y & B \end{bmatrix}$$

and the equivalence class having as member the unit cell array $$\begin{bmatrix} C & Y \\ B & M \end{bmatrix}.$$

However, the first displayed equivalence class is a preferred embodiment.

Figure 3:
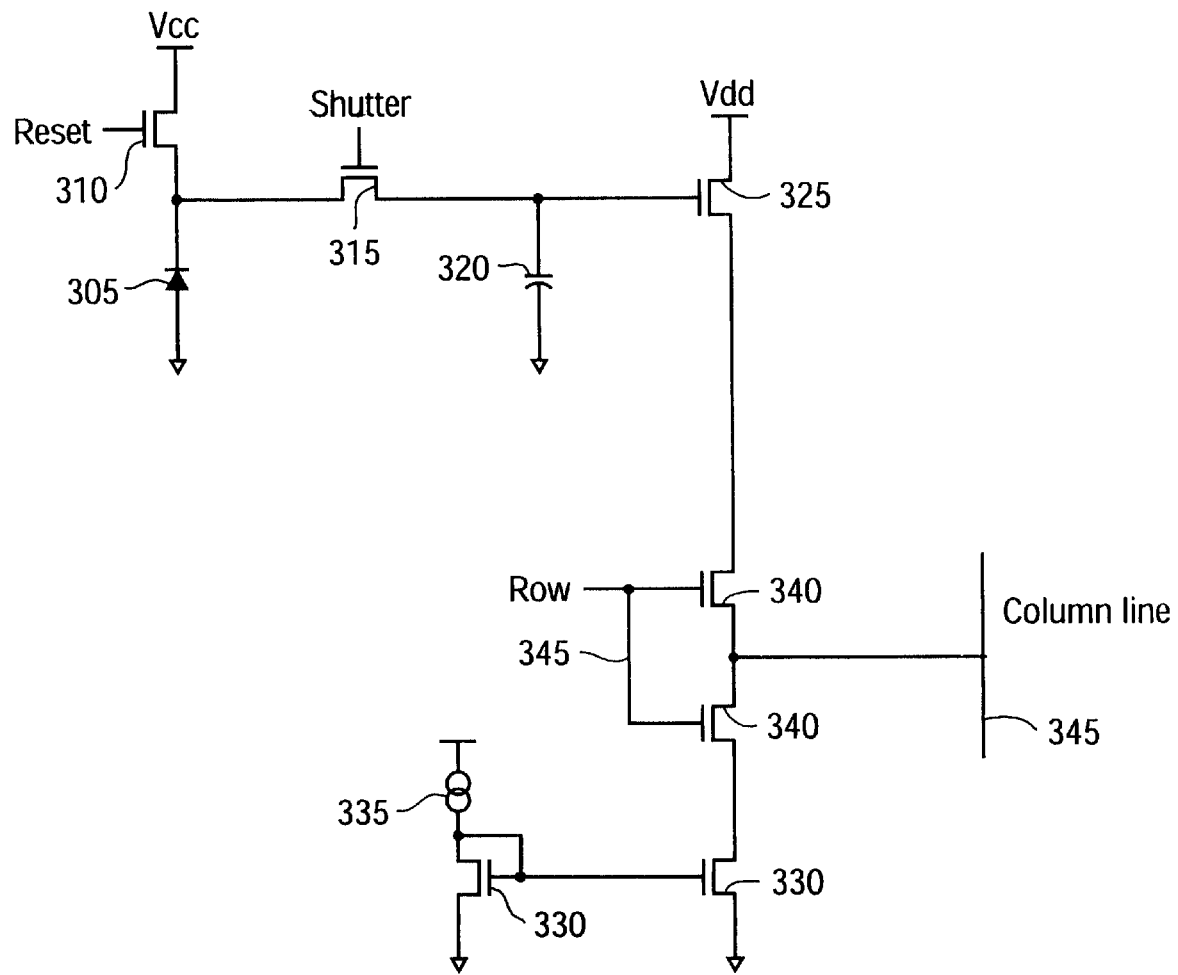
FIG. 3 is a circuit diagram of a pixel sensor.

For notational simplicity, we shall denote a pixel sensor as cyan, magenta, yellow, or blue, if it is responsive to substantially only electromagnetic radiation passed by a cyan, magenta, yellow, or blue pass filter, respectively. An embodiment of a pixel sensor circuit in which the output signal is a voltage is shown in FIG. 3, where the pixel sensor circuit comprises pixel photo diode 305 and associated circuitry. Photons captured by diode 305 are measured in the following way. A reset voltage signal goes HIGH to switch nMOSFET 310 ON so that diode 305 is reverse biased to a reverse bias voltage $V_{CC}$. This creates a wide depletion layer within diode 305. While reset voltage signal is HIGH, a shutter voltage signal also is set HIGH to switch nMOSFET 315 ON so that capacitor 320 is charged to the reverse bias voltage of diode 305. When diode 305 is impacted by a photon with sufficient energy, the photon generates an electron-hole pair. If the reset voltage signal is brought LOW so that nMOSFET 310 is OFF but the shutter voltage signal is still HIGH, then electron-hole pairs generated by photons captured in diode 305 discharge diode's 305 parasitic capacitance, reducing diode's 305 reverse bias voltage and similarly reducing the voltage stored on capacitor 320. The length of time for which the shutter voltage signal is HIGH and the reset voltage signal is LOW determines the integration time. In one embodiment, diode 305 is initially biased to approximately 2.3 volts.

Figure 4:
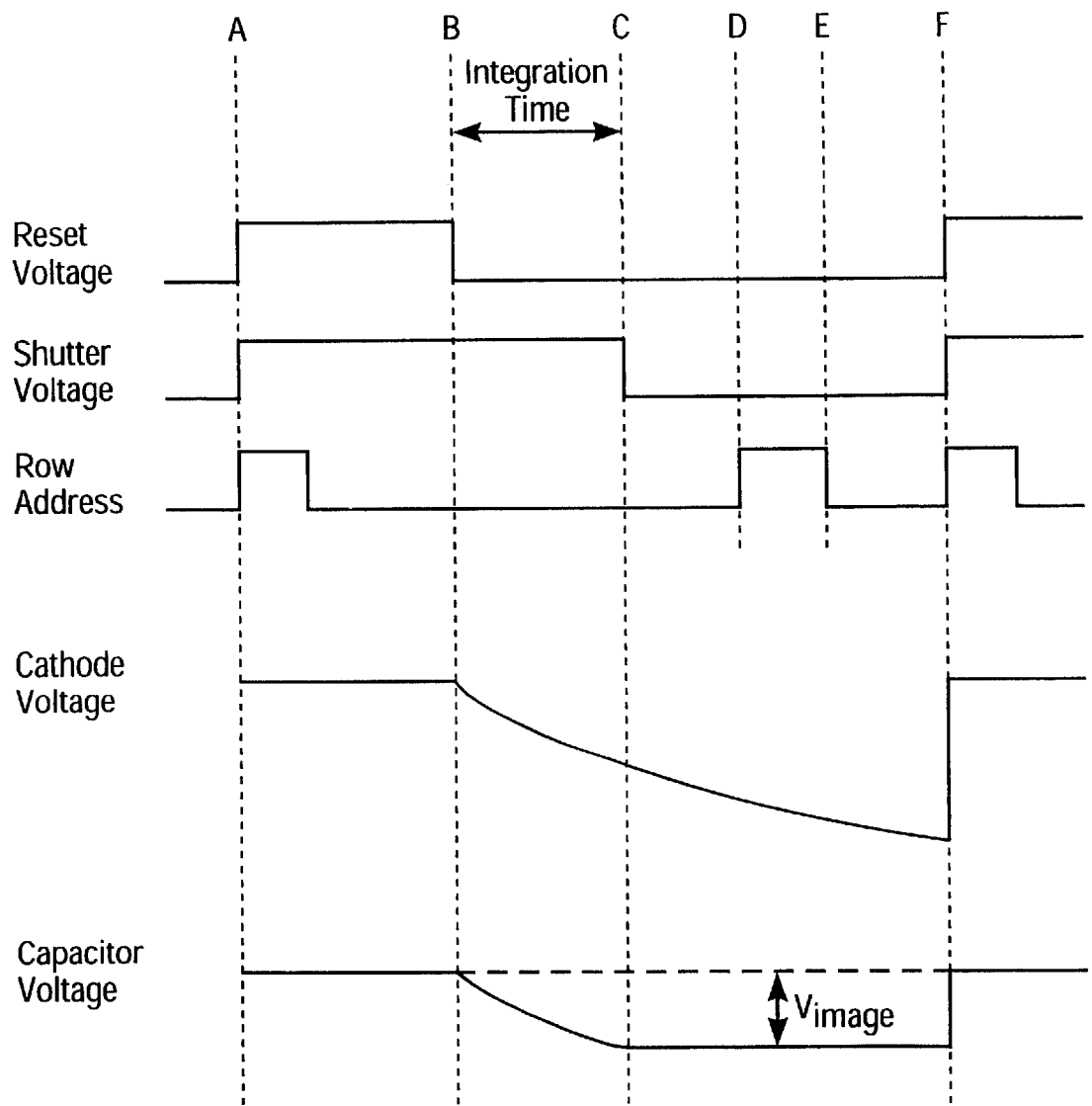
FIG. 4 is a signal timing diagram for the pixel sensor circuit of FIG. 3.

FIG. 4 illustrates various signals related to FIG. 3. In FIG. 4, the reset and shutter voltage signals are HIGH during time segment A-B, whereas the reset voltage signal is OFF during time segment B-C but the shutter voltage signal is HIGH. Time segment B-C represents the integration time. During the integration time, the voltage at the cathode of diode 305 and the voltage of capacitor 320 are decaying due to the generation of electron-hole pairs. After the shutter voltage signal goes LOW at time C, the cathode voltage of diode 305 continues to decay, but the voltage of capacitor 320 stays approximately constant. The voltage difference denoted by $V_{image}$ in FIG. 4, which is the difference between the initial and final voltages of capacitor 320, represents the time integration of the intensity of light captured by pixel diode 305 during a frame time.

To determine $V_{image}$, the voltage of capacitor 320 needs to be read when diode 305 is fully reverse biased (when the reset voltage signal is HIGH) and when the shutter voltage signal returns LOW. The voltage of capacitor 320 is read at the source of nMOSFET 325, where nMOSFET 325, current mirror nMOSFETs 330, and current source 335 comprise a follower. The source voltage of nMOSFET 325 is read by switching a row address voltage signal HIGH so that nMOSFETs 340 are ON. If column line 345 is properly discharged before the row address voltage signal is HIGH, then the voltage on column line 345 is to within a threshold voltage drop of the voltage of capacitor 320. Not shown in FIG. 3 are other column pixels coupled to column line 345 and identical in structure to that shown in FIG. 3.

The row address voltage signal is shown in FIG. 4. By setting the row address voltage signal HIGH during the time segment A-B, the source voltage of nMOSFET 325 is read when capacitor 320 is fully charged, and by setting the row address voltage signal HIGH during the time segment C-F (but not at time F) the source voltage of nMOSFET 325 is read when capacitor 320 is discharged after the integration time. The former and latter read source voltages provide calibration and sample voltage signals, respectively. If dark voltage was not present, then $V_{image}$ would be an accurate representation of the time integration of the light intensity incident upon pixel diode 305. Subtracting the sample voltage signal from the calibration voltage signal compensates for pixel-to-pixel variation, such as differences in threshold voltages for the source follower transistors (nMOSFET 325).

Let $V_C$, $V_M$, $V_Y$, and $V_B$ denote, respectively, output signals from cyan, magenta, yellow, and blue pixel sensors. These signals may be voltages or currents. These output signals may need to be processed into another color space before rendering an image. Processing from the CMYB color space into the standard color space (CIE XYZ) (Commission Internationale de l'Eclairage) may be accomplished by a linear transformation of the form:

$$\begin{bmatrix} X \\ Y \\ Z \end{bmatrix} = M \begin{bmatrix} V_C \\ V_M \\ V_Y \\ V_B \end{bmatrix},$$

where X, Y, and Z are signals in the standard color space and M is a 3 by 4 matrix. Once a transformation is given from the CMYB color space into the standard color space, transformations from the CMYB space into some other space such as RGB or CMY is easily given by multiplication of the appropriate matrices. One particular example of M is $$M = \begin{bmatrix} -1.586 & -2.704 & 2.198 & 3.475 \\ -1.395 & -0.331 & 1.551 & 1.175 \\ -0.674 & -2.389 & 0.677 & 4.592 \end{bmatrix}.$$

However, an optimum choice for M depends upon the transmission characteristics of the C, M Y, and B filters.

Figure 5:
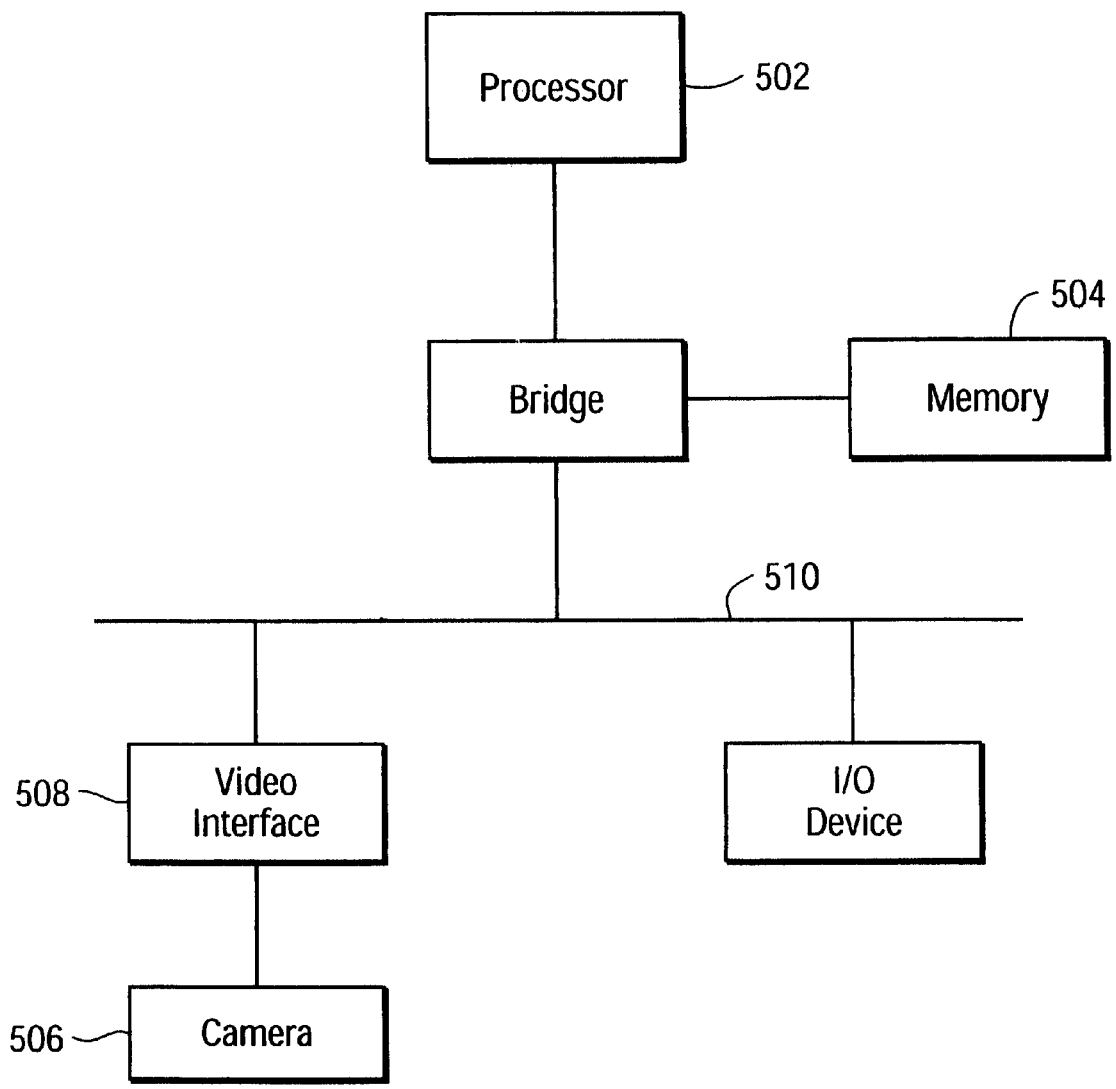
FIG. 5 is a simplified diagram of a computer system.

Processing signals in the CMYB space into signals in another color space may be performed by non-programmed hardwired circuits (either analog or digital), by circuits programmed by firmware (software stored in non-volatile memory), by a computer, or any combination of such methods. For example, a simplified computer system is illustrated in FIG. 5. In the embodiment of FIG. 5, processor 502 performs the color space transformations, where the software code for performing this transformation is stored in memory 504. In FIG. 5, camera 506, comprising pixel sensors and appropriate circuits, provides signals to processor 502. Video interface circuit 508, which for some embodiments may not be needed, provides for communication between processor 502 and camera 506 via bus 510. As one alternative to the embodiment of FIG. 5, color space transformations may be performed by circuits within camera 506.

For an ideal Macbeth color patch array, simulations have shown that the CMYB space can provide more accurate color representation than the RGB or CMY spaces. The advantages of the CMYB space may be more pronounced for photo diodes with a quantum efficiency peaked about the middle of the visible spectrum (≈530 nm). However, the CMYB space may be used with all types of photo diodes.

Many variations to the disclosed embodiments may be realized without departing from the scope of the invention as claimed below.

I claim:

1. A color filter array comprising a unit cell array, wherein the unit cell array comprises a two by two array having a cyan pass filter, a magenta pass filter, a blue pass filter, and a yellow pass filter.

2. The color filter as set forth in claim 1, wherein the two by two array is $$\begin{bmatrix} C & M \\ B & Y \end{bmatrix}.$$

3. An imaging device comprising:
a color filter array comprising a unit cell array, wherein the unit cell array comprises a two by two array having a cyan pass filter, a magenta pass filter, a blue pass filter, and a yellow pass filter;
an array of pixel sensors, wherein for some range of position indices u and v, a pixel sensor at position (u,v) is to provide an output signal X(u,v) indicative of electromagnetic radiation propagating through the color filter array and impinging upon the pixel sensor at position (u,v).

4. The imaging device as set forth in claim 3, wherein the two by two array is $$\begin{bmatrix} C & M \\ B & Y \end{bmatrix}.$$

5. An imaging system comprising:
an imaging device comprising
a color filter array comprising a unit cell array, wherein the unit cell array comprises a two by two array having a cyan pass filter, a magenta pass filter, a blue pass filter, and a yellow pass filter;
an array of pixel sensors to provide output signals, wherein for some range of position indices u and v, a pixel sensor at position (u,v) is to provide an output signal X(u,v) indicative of electromagnetic radiation propagating through the color filter array and impinging upon the pixel sensor at position (u,v); and
at least one processor in communication with the imaging device to transform the output signals into a set of signals indicative of a color space, wherein the color space is other than a CMYB color space defined by the output signals.

6. The imaging system as set forth in claim 5, wherein the two by two array is $$\begin{bmatrix} C & M \\ B & Y \end{bmatrix}.$$

7. An imaging device to provide signals in a CMYB color space.

8. A computer readable medium, wherein stored on the computer readable medium are computer readable instructions to transform signals in a CMYB color space into signals indicative of another color space.

* * * * *